United States Patent [19]

Goldacker et al.

[11] 4,246,238
[45] Jan. 20, 1981

[54] DISSOLVER FOR REMOVING NUCLEAR FUEL MATERIALS FROM FUEL ELEMENT SEGMENTS

[75] Inventors: Hubert Goldacker, Linkenheim; Günter Koch, Karlsruhe-Grünwettersbach; Helmut Schmieder, Karlsruhe; Ernst Warnecke, Ladenburg; Walter Comper, Karlsruhe, all of Fed. Rep. of Germany

[73] Assignee: Kernforschungszentrum Karlsruhe GmbH, Karlsruhe, Fed. Rep. of Germany

[21] Appl. No.: 893,777

[22] Filed: Apr. 5, 1978

[30] Foreign Application Priority Data

Apr. 6, 1977 [DE] Fed. Rep. of Germany ....... 2715367

[51] Int. Cl.² ................. B01D 11/02; B01F 1/00; G21F 9/30
[52] U.S. Cl. .................... 422/275; 422/277; 422/278; 252/301.1 W
[58] Field of Search .............. 422/159, 263, 275–278; 176/39; 252/301.1 W

[56] References Cited

U.S. PATENT DOCUMENTS

| | | | |
|---|---|---|---|
| 3,195,984 | 7/1965 | Sands | 422/159 |
| 3,352,645 | 11/1967 | Faugeras et al. | 422/159 |
| 3,607,107 | 9/1971 | Ayers | 422/159 |
| 3,984,345 | 10/1976 | Heylen et al. | 252/301.1 W |
| 4,018,561 | 4/1977 | Shemens et al. | 422/159 |
| 4,021,676 | 5/1977 | Duffy | 252/301.1 W |
| 4,056,362 | 11/1977 | Gablin et al. | 176/39 |

FOREIGN PATENT DOCUMENTS 2520940 11/1976 Fed. Rep. of Germany ... 252/301.1 W

*Primary Examiner*—Bradley R. Garris
*Attorney, Agent, or Firm*—Spencer & Kaye

[57] ABSTRACT

A dissolver for dissolving nuclear fuel materials out of fuel element segments during reprocessing of irradiated nuclear fuels, the dissolver being made of a material which is a neutron absorber and being composed of a dissolving vessel and a dissolving basket disposed in the vessel to receive such fuel element segments and to permit flow of dissolving fluid therethrough, with the basket being divided into a plurality of individual sections or compartments so as to prevent establishment of a critical state in the dissolver.

7 Claims, 4 Drawing Figures

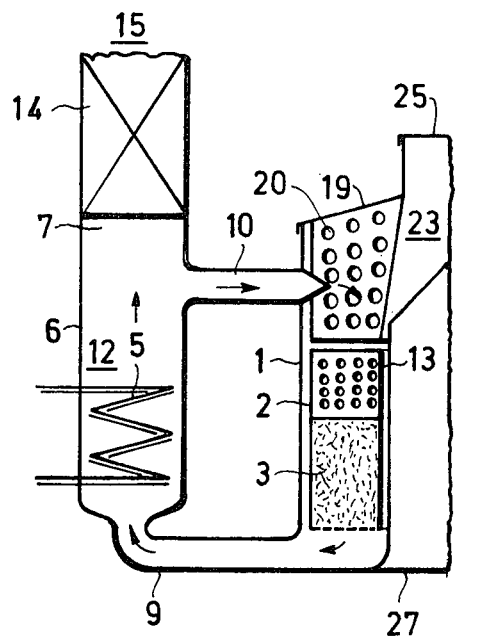
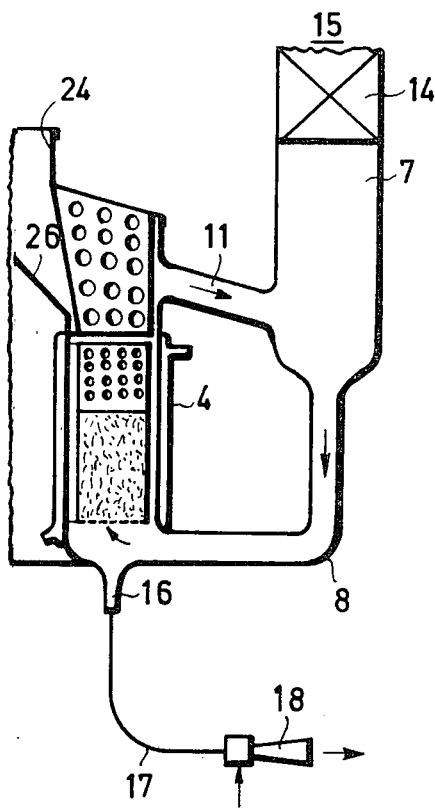
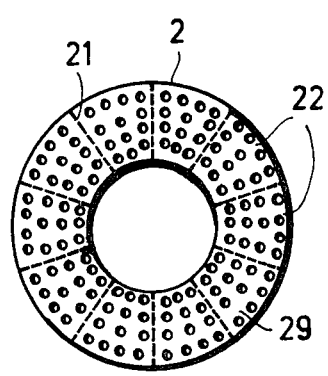
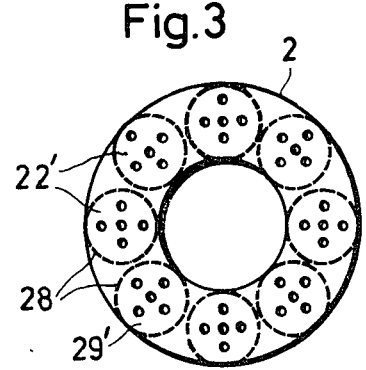

DISSOLVER FOR REMOVING NUCLEAR FUEL MATERIALS FROM FUEL ELEMENT SEGMENTS

BACKGROUND OF THE INVENTION

The present invention relates to a dissolver for removing nuclear fuel materials from fuel element segments during reprocessing of irradiated nuclear fuels.

In such apparatus, for reasons of criticality, the structural parts are made of a material which is a neutron absorber such as, for example, hafnium, and the dissolver is composed of a dissolving vessel into which a dissolving basket containing the fuel element sections which are to be subjected to the dissolving process can be placed so that fluid can flow therethrough. The fuel elements of nuclear reactors in the majority of cases are composed of the actual nuclear fuel and a metallic protective sleeve or shell.

At the beginning of such a reprocessing procedure, the irradiated reactor fuel elements are initially cut up mechanically into short fuel rod segments. These fuel rod segments, together with the structural components of the fuel elements, which include spacers and head and foot pieces, drop into the dissolving basket which is disposed in the dissolving vessel. In the dissolver, the nuclear fuel material is dissolved out of the fuel rod segments by means of boiling nitric acid. Upon completion of the dissolving process, the nitric acid-containing fuel material solution is extracted, the empty sleeves are washed with fresh acid and then the basket together with the empty sleeves and the other structural material is removed from the dissolving vessel, is washed with fresh water and then the basket is emptied.

The fuel material solution is subjected to further chemical processing for separating the reusable nuclear fuel material, preferably uranium and plutonium as well as possibly thorium, from the fission products. The leached sleeves and the structural material constitute solid radioactive waste and are treated and stored accordingly.

During the dissolving of the fuel materials, the presence of fissionable material, preferably uranium and/or plutonium, poses a particular problem. This involves the danger of establishment of a "critical state" in the system in which a self-sustaining nuclear chain reaction could take place. For this reason measures must be taken which prevent such critical excursion under any circumstances.

This problem has heretofore been solved by constructing the dissolver to have "geometrically critically safe" external dimensions, i.e. its dimensions were limited to values which, under consideration of the amount of fissionable material contained in the fuels to be processed, lie below the minimum citical dimensions. However, this greatly limits the volume, and thus the capacity, or fuel throughput, of the dissolver. Such dissolvers can thus be used economically only for small reprocessing systems or for nuclear fuel materials having a low content of fissionable material, such as, for example, those from heavy water natural uranium reactors.

In order to have available larger capacity dissolvers, for example for system throughputs of several tons of uranium per day, for nuclear fuel materials from modern power reactors containing greater amounts of fissionable material, e.g. light water reactors with enriched uranium oxide or with plutonium oxide/uranium oxide as the fuel material, it is known in the art to add a "soluble neutron poison", i.e. a dissolved substance having a high capture cross section for neutrons, particularly gadolinium nitrate, to the dissolving acid. However, this process has the drawback that the dissolved neutron poison is lost in the subsequent chemical reprocessing procedure together with the highly active waste and cannot be recovered. Due to the high cost and limited availability of soluble neutron poisons as well as the highly active waste connected with its use and the problems of further processing such waste, this process is very uneconomical.

Economical operation is made even more difficult by the fact that the constant presence of a soluble neutron poison in the dissolving acid must be continuously verified, involving high monitoring expenses and entailing extensive use of automated control instruments so as to exclude the possibility of a criticality accident.

It has also already been proposed to use hafnium in the reprocessing systems for the purpose of heterogenous poisoning.

The prior art dissolvers for large systems, in which head and foot portions and spacers of the fuel rod bundles are also introduced into the basket, are designed to have a diameter of 70 cm and a height of 5 m. They pose great handling problems to their users and must additionally be loaded with the above-mentioned soluble and nonextractable neutron poisons, which must be continuously added and which adversely influence the highly active waste as salt formers, i.e. they limit the possible concentration by salts which are inherently inactive.

In summary, it can be stated that large reprocessing systems, those with capacities of the order of magnitude of 1500 tons per year, require either too many geometrically safe dissolvers, that is many mechanical devices subject to malfunctions and requiring many operations, or the use of soluble neutron poisons which present the above-mentioned drawbacks.

SUMMARY OF THE INVENTION

Based on this state of the art, it is an object of the present invention to provide a large capacity dissolver using, for example, hafnium as the neutron poison.

A further object of the invention is to provide a dissolver which can operate on fuel materials containing a large amount of fissionable material to which no soluble neutron poison need be added.

The invention is particularly directed to a dissolver which can process fuel materials from light water reactors using enriched uranium oxide or plutonium oxide/uranium oxide as fuel material or from fast breeder reactors using plutonium oxide/uranium oxide, or uranium oxide enriched with $U^{233}$ and/or $U^{235}$, and/or uranium oxide/thorium oxide and/or uranium oxide/plutonium oxide/thoriumoxide as fuel material.

Another object of the invention is to provide a dissolver which makes possible an increase in throughout compared to prior art dissolvers, or a very high throughput, but which is criticality safe or has subcritical structural dimensions.

These and other objects are accomplished according to the present invention by providing a dissolver of the above-described type in which the interior of the dissolving basket which receives the cut up fuel element segments is divided into a plurality of individual sections or chambers, respectively, partitions being provided in the basket to create individual chambers, the partitions being in the form of screens and being made of the same material as the other parts of the apparatus.

In further accordance with the present invention, the dimensions of the individual chambers of the dissolving basket correspond, in their cross-sectional planes, to the outer dimensions of the fuel element sections and the partitions are made of sheet metal, plates, grids or bolts with constant or variable cross sections. The cross sections may also be variable over the height of the basket or the partitions may be arranged changeable in the interior of the dissolving basket.

It is of particular advantage, according to the present invention, for the dissolving basket to have a circular cross section and the partitions which divide its interior to be arranged as radii or chords in the interior of the basket.

In further accordance with the invention, the dissolving basket may have a block-shaped cross section, in which case the partitions are arranged transversely to or at an angle to the side walls.

According to a further, highly favorable embodiment of the present invention, the dissolving basket is formed to have an annular cross section and the partitions are oriented radially within the annular basket. The individual chambers may also be formed of juxtaposed pieces of pipe and the partitions may be perforated in an advantageous manner. Finally, a particularly advantageous feature of this embodiment of the present invention resides in the provision of a distributor cone disposed in the cylindrical region formed within the annular dissolving basket at the bottom of the dissolving vessel, the distributor cone being made of the same structural material as the remainder of the dissolver and its conical tip protruding above the top of the dissolving vessel.

A dissolver presenting the features of the present invention offers the advantage that periodic checking for the presence of an absorber is practically eliminated or can be performed under significantly easier conditions. In addition, it is possible, as a result of the present invention, to construct a dissolver which has a significantly greater throughput than the prior art dissolvers but has the criticality safety of known conventional and smaller vessels.

BRIEF DESCRIPTION OF THE DRAWINGS

FIGS. 1a and 1b are elevational, cross-sectional partial views of two embodiments of an annular dissolver according to the invention for processing cut up nuclear reactor fuel rods, two fuel rods being heated directly in dissolving acid in the embodiment of FIG. 1a and being heated indirectly or externally in the embodiment of FIG. 1b.

FIGS. 2 and 3 are detail plan views of two cross-sectional configurations of an annular dissolving basket for the dissolvers of FIG. 1.

DESCRIPTION OF THE PREFERRED EMBODIMENTS

FIGS. 1a and 1b each shows a dissolver provided with an annular dissolving vessel 1 in which an annular dissolving basket 2 is disposed. Two preferred cross-sectional configurations for such a dissolving basket are shown in FIGS. 2 and 3. Cut up fuel rod segments 3 are delivered into the dissolving basket 2 and the nuclear fuel material which they contain is dissolved out by means of boiling nitric acid according to the above-described known reprocessing procedure.

The examples disclosed herein all are based on the principle of a natural circulation evaporator.

In the embodiment of FIG. 1b, the annular vessel 1 is provided with so-called heating pockets 4 to heat the solvent and the dissolving basket 2.

In the embodiment shown in FIG. 1a, the heat exchanger or the heating means is separate from the dissolving vessel 1. For this purpose, a steam heated tubular heat exchanger 5 is disposed in a heat exchanger chamber 12 located in a vessel 6 so as to be in the acid circulation circuit. If, for example, a heat exchanger is used that is made up of a bundle of pipes, it is possible to reduce the danger of crusts forming on the heating surfaces. In the embodiment of FIG. 1a boiling acid is fed in from the top into the dissolving basket 2 via inlet line, or pipe, 10 so that individual fuel rod segments 3 are less likely to float up and block the evaporator chamber 7 and lines 10 and 11. In the embodiment of FIG. 1a, pipes 9 and 10 connect the heat exchanger chamber 12 in vessel 6 with the dissolving basket 2 and close the acid circulation circuit. In FIG. 1b, acid is supplied to vessel 1 from the bottom by inlet pipe 8 and is returned to evaporator chamber 7 via inlet pipe 11.

In the embodiment of FIG. 1a, acid flows downwardly through basket 2, while in the embodiment of FIG. 1b acid flows upwardly therethrough.

The acid which, due to the presence of vapor bubbles therein, has a reduced specific weight, rises up to the evaporator chamber 7 where vapor and liquid are separated. In order to utilize the great difference in density between those two phases, the inlet pipes 10 or 8, respectively, are oriented tangentially to vessel 1 so as to produce a vortex effect in the annular chamber 13 or in the dissolving basket 2. Then, in the embodiment of FIG. 1a, the acid flows at approximately its boiling temperature through pipe 9 back into the heat exchanger chamber 12. A condensate cooler 14 is disposed above the evaporator chamber 7 where the major portion of the vapor is recondensed. Only nitrous oxides, gaseous fission products such as iodine, tritium, and noble gases, the quantity of water vapor which corresponds to the dew point and the rinsing gas for the cut up fuel rod segments appear at point 15 as dissolver waste gas.

The embodiment shown in FIG. 1b is identical to that of FIG. 1a insofar as concerns the dissolving basket 2 but, as already mentioned, heating is effected by means of heating pockets 4 which are attached directly to the dissolving vessel 1. Moreover, the fluid from inlet line 8 flows through the vessel 1, or the dissolving basket 2, from the bottom to the top. After passing through the vessel 1, or the basket 2, the fluid enters the evaporator chamber 7 through line 11, from where it is conducted downwardly back into the annular vessel 1. Upon completion of the dissolving process, the fuel material solution can be extracted by suction via a pipe 16 into a line 17, a steam jet pump 18 advisably being used to produce the conveying force. As in the embodiment of FIG. 1a, condensation with rectification effect via cooler 14 takes place above evaporator chamber 7 so that the above-described effect is produced. Each of the dissolving-basket 2 could be provided with its own inlet pipe 8 or 10, outlet pipe 9 or 11 and removal system 16, 17, 18.

In each of the embodiments of FIGS. 1a and 1b, the dissolving vessel 1 is loaded from the top. For this purpose a removable cover 19 is provided on vessel 1 and perforated guide sheets 20 that extend down to the basket 2 are attached to this cover 19. These guide sheets 20 are also made of the neutron poison, or absorber, material hafnium and, in addition to guiding the dissolving fluid, serve the purpose of increasing the proportion of neutron poison or absorber material within the area where the fuel material is dissolved.

These sheets 20 are aligned approximately with the intermediate bars or radial sheets 21, respectively, with which the embodiment of dissolving basket 2 shown in FIG. 2 is divided into individual sections or compartments 22. Sheets 20 terminate in cover 19 at a distance from the center of the dissolver so that a fill chamber 23 with a fill opening 24 is formed, this opening being sealed off by means of a further removable cover 25. The bottom of chamber 23 is delimited by an upwardly tapering distributor cone 26.

Cover 19 is provided to permit introduction of basket 2 into the vessel 1, after removal of cover 19. For introduction of fuel rod segments 3, cover 19 is closed so that sheets 20 are in place and cover 25 is removed to permit segments 3 to be delivered to basket 2 through fill opening 24 and fill chamber 23, with distributor cone 26 causing segments 23 to be homogeneously distributed among the chambers of basket 2. Cone 26 is mounted on the bottom 27 of the annular vessel 1 so that the fuel rod segments are conducted into chamber 13 which is part of basket 2.

FIGS. 2 and 3 show two embodiments of the basket having different cross-sectional shapes. Both embodiments have in common that the annular chamber is divided into individual compartments 22 or 22' which are either delimited by radial vanes 21 in FIG. 2 or formed of juxtaposed pipe sections 28 in FIG. 3. All of the parts of each of baskets 2 and 2' are here likewise made of hafnium, and the partitions 21, the pipe sections 28 and the bottoms 29 or 29' of the baskets may be perforated to enhance flowthrough of dissolving fluid.

The basket may have various other forms of construction which are not shown in detail. All have in common that the dimensions of the individual chambers correspond approximately to the maximum outer dimensions of the fuel rod segments to be processed. The partitions may be distributed uniformly or nonuniformly and may be made of metal sheets, plates, bolts, sieves or pipes or similar inserts. The cross section of each of these partitions may also be variable over the height of the basket.

The discontinuous dissolving process in the dissolver takes place approximately as follows:

The undivided fuel element bundles are introduced into a comminutor (not shown) where they are cut into segments. The segments are then conveyed along a type of slide, drop through fill opening 24, and are deflected by cone 26 into basket 2 which is immersed in prepared approximately 6 to 8 molar boiling nitric acid. When the desired quantity of fuel elements, e.g. about 1.2 to 3 tons of fuel material including sleeves, has been loaded, the fill opening 24 is closed with cover 25 and the main dissolving process begins. The dissolving process can take place only via the two open ends of each cut up rod section 3, so that a high circulation speed of the dissolving acid is required for fast removal and mixing of saturated portions of the solution from basket 2. The main dissolving process takes approximately 8 to 12 hours with the speed of dissolution continuously decreasing. If that speed becomes too low, the fuel element solution can be extracted, for example, and the remaining fuel material can be quantitatively dissolved by the addition of fresh, unspent nitric acid to form a subsequent solution. Thereafter, the entire basket 2 with the now empty sleeves is lifted out of dissolver 1 through an opening of appropriate size after cover 19 has been removed. The sleeves are dumped out of the basket 2 for storage. The entire cycle takes about 18 to 20 hours.

Criticality calculations for the dissolver according to the invention have shown that with the use of hafnium as the structural material it is possible to obtain criticality-safe arrangement for the fuel material compositions or solutions, respectively, in the dissolver, i.e. that the entire arrangement, under consideration of the composition of the nuclear fuel material intended to be processed, and particularly with respect to its contents of fissionable nuclides, has a neutron multiplication factor $k_{eff}$ which lies sufficiently below 1.

It will be understood that the above description of the present invention is susceptible to various modifications, changes and adaptations, and the same are intended to be comprehended within the meaning and range of equivalents of the appended claims.

What is claimed is:

1. In a dissolver for dissolving nuclear fuel materials out of fuel element segments during reprocessing of irradiated nuclear fuels, in which the structural components of the dissolver are made of a material which is a neutron absorber, the dissolver being composed of a dissolving vessel and a dissolving basket inserted in the vessel, the basket being arranged to receive fuel element segments which are to be subjected to the dissolving process and to permit the flow through of dissolving fluid, the improvement wherein said dissolving basket has an annular cross section and said dissolver comprises partitions having a sieve-like configuration and disposed in said basket for dividing the interior of said dissolving basket substantially along radii thereof into a plurality of individual fuel element-receiving chambers, and a distributor cone disposed in the cylindrical area enclosed by said annular basket, seated on the bottom of said dissolving vessel, and having its conical tip protruding above the top of said basket.

2. An arrangement as defined in claim 1 wherein the transverse dimensions of said individual chambers of said dissolving basket correspond to the maximum external dimensions of the fuel element segments.

3. An arrangement as defined in claim 2 wherein said partitions are made of metal sheets, plates or sieves.

4. An arrangement as defined in claim 1 wherein said partitions are arranged and constructed to be changeable in the interior of said dissolving basket.

5. An arrangement as defined in claim 1 wherein said basket has an annular cross section and said partitions are constituted by juxtaposed pieces of pipe.

6. An arrangement as defined in claim 1 wherein said dissolver further comprises acid solvent delivery means positioned for delivering solvent to said chambers via the top of said basket.

7. An arrangement as defined in claim 1 wherein said dissolver further comprises acid solvent supply means oriented relative to said basket for delivering solvent to said chambers in directions which are substantially tangential relative to said annular dissolving basket.

* * * * *